United States Patent [19]

Malik

[11] Patent Number: 4,762,201
[45] Date of Patent: Aug. 9, 1988

[54] DRY SUMP SCAVENGING SYSTEM WITH INDEPENDENT HEAD SOURCE

[75] Inventor: Marvin J. Malik, Bloomfield Hills, Mich.

[73] Assignee: General Motors Corporation, Detroit, Mich.

[21] Appl. No.: 37,700

[22] Filed: Apr. 13, 1987

[51] Int. Cl.$^4$ .................. F01M 9/10; F01M 11/04
[52] U.S. Cl. ........................ 184/6.13; 417/41; 417/126
[58] Field of Search ............ 184/6.13, 6.5; 417/41, 417/126, 127

[56] References Cited

U.S. PATENT DOCUMENTS

| 432,849 | 7/1890 | Wright | 417/132 |
|---|---|---|---|
| 1,457,286 | 5/1923 | Sparks | 417/41 |
| 2,177,517 | 10/1939 | Cuthrell | 417/132 X |
| 2,453,217 | 11/1948 | Gregg et al. | 184/6.13 |
| 2,874,804 | 2/1959 | Haas | 184/6.13 |

FOREIGN PATENT DOCUMENTS

| 753372 | 4/1953 | Fed. Rep. of Germany | 184/6.13 |

Primary Examiner—William L. Freeh
Assistant Examiner—Theodore Olds
Attorney, Agent, or Firm—Donald F. Scherer

[57] ABSTRACT

A scavenging system (10 or 110) for hydraulic circulation installations. A pump (25) delivers the hydraulic fluid (19) which is thereafter collected in a sump (18 or 18A) that is to be maintained essentially dry. A reservoir (28), independent of the sump (18 or 18A), is supplied for storing the requisite volume of hydraulic fluid (19) for the installation with which the scavenging system (10 or 110) is to be used, and a pump (25) supplies the fluid (19) from this reservoir (28). At least one pickup head assembly (22) is disposed within each sump (18 or 18A), and a float valve (45) is mounted within each pickup head assembly (22). The float valve (45) acts, in response to the level of the fluid (19) within the sump (18 or 18A), to open and close communication through a scavenging conduit system (38) that connects between the sump (18 or 18A) and the reservoir (28). Means (59 or 85) independent of the pump (25) provide a pressure differential between the reservoir (28) and each sump (18 or 18A) sufficient to lift the fluid (19) within the sump (18 or 18A), through the scavenging conduit system (38) and into the reservoir (28) without reducing the pressure within the reservoir (28) to a level that would interefere with the operation of the pump (25) in delivering the fluid (19) from the reservoir (28).

1 Claim, 3 Drawing Sheets

DRY SUMP SCAVENGING SYSTEM WITH INDEPENDENT HEAD SOURCE

TECHNICAL FIELD

The present invention relates generally to recirculating hydraulic installations. More particularly, the present invention relates to hydraulic installations wherein a sump is provided to collect the hydraulic fluid and a reservoir is provided to store the hydraulic fluid so the sump can be maintained in an essentially dry condition. Specifically, the present invention relates to a fluid scavenging system wherein a pump is provided continuously to deliver hydraulic fluid from the reservoir to the location where the fluid is intended to be used. As the fluid thereafter collects in a sump, means other than the pump creates a pressure head differential between the sump and the reservoir whereby the fluid that pools in the sump will be scavenged through a unique pickup head assembly, which precludes the entrainment of air in the hydraulic fluid, and returned to the reservoir in order to maintain the sump essentially dry.

BACKGROUND OF THE INVENTION

Recirculating hydraulic installations are particularly adapted to the lubrication of automotive engines and transmissions. Lubrication serves not only to reduce friction, and thus wear, between the moving parts but also to disperse heat, to reduce corrosion and, in the engine, to assist in the sealing action of the piston rings. In most modern engines, or transmissions, the lubricating fluid is stored in the pan, or sump, that normally comprises the lowest part of the crankcase, or transmission housing. The lubricating fluid is fed by a pump to the moving parts and returns, by gravity, to the sump. In addition to serving as the reservoir, the sump also serves as a cooler because it is normally located in, or in close proximity to, the airstream beneath the vehicle.

It must be appreciated that moving parts can lose considerable energy by virtue of parasitic drag resulting from high speed contact between the moving parts and the lubricating fluid. In addition, the turbulence created by such contact results in considerable entrainment of air in the hydraulic fluid. Aeration of hydraulic fluids such as lubricating oils, and particularly in the high temperature environment of an engine, or the like, allows a build up of acids in the lubricating fluid. Those acids are, of course, quite deleterious to the parts which the fluid is intended to lubricate.

In an attempt to obviate such difficulties many high performance vehicles employ a "dry sump" system for the engine and/or transmission. Dry sump systems store the lubricating fluid in a tank, or reservoir, which may, incidentally, also function as a cooling radiator. Prior known dry sump systems deliver the lubricating fluid from the reservoir to the parts to be lubricated by a first pump, and as that fluid collects in the sump it is generally scavenged from the sump by employing a second pump that returns the fluid to the reservoir in order to maintain the sump essentially dry.

The heretofore known dual pump arrangements have been quite successful in maintaining the sump relatively dry, but in doing so such arrangements have, unfortunately, fostered the entrainment of a considerable amount of air within the lubricating fluid. The undesirable entrainment of air results from unsuccessfully attempting to balance the rate, or volume, of the flow out of the sump (occasioned by the action of one pump) with the rate, or volume, of the flow returning to the sump (occasioned by the action of the other pump in delivering the fluid for the purpose of lubrication). This inherent difficulty with dual pump arrangements has been further compounded by the fact that in a moving environment, such as in a vehicle, the sump cannot be maintained in any one attitude. Thus, the normal motion of the vehicle tends to move the fluid toward and away from the intake to that pump which serves to scavenge the sump, thereby effecting the undesirable intrusion of air into the system.

In some environments it may be possible to provide a sump having sufficient depth so that the intake to the recirculating pump will remain submerged within the fluid in the sump during the normal movement of the vehicle over the roadway. However, the clearance between the roadway and the sump is not always sufficient to permit the use of a sump having the configuration necessary to assure that the intake for the recirculating pump will remain submerged.

SUMMARY OF THE INVENTION

It is, therefore, a primary object of the present invention to provide a scavenging system for hydraulic fluid that will maintain the sump essentially dry and yet preclude the entrainment of air into the fluid.

It is another object of the present invention to provide a scavenging system, as above, that employs a unique arrangement which permits fluid to be scavenged from the sump only when the level of the fluid therein rises above a predetermined level and then for only so long as the fluid remains at, or above, that level.

It is a further object of the present invention to provide a scavenging system, as above, that will achieve the desired results even though a second pump means may be employed to effect a pressure head differential between the sump and the reservoir that is sufficient to lift the fluid from the sump, through a conduit means and into the reservoir.

It is yet another object of the present invention to provide a scavenging system, as above, that will be fully functional within the minimal clearance dimensions provided between the sump and the roadway of even high performance vehicles.

These and other objects of the invention, as well as the advantages thereof over existing and prior art forms, which will be apparent in view of the following detailed specification, are accomplished by means hereinafter described and claimed.

In general, a scavenging system embodying the concepts of the present invention employs an independent reservoir to store the requisite volume of fluid required for the hydraulic installation with which the scavenging system is to be used. A pump delivers the hydraulic fluid from the reservoir to the location where it is to perform its function, and the fluid then collects, normally by gravity, within one or more sumps. One or more depressions, or wells, are preferably located at the lowest level(s) of each sump.

In order to maintain the sump(s) essentially dry, a pickup head assembly is located in each well, and a scavenging conduit system communicates between the pickup head assemblies and the reservoir. A float valve, which opens and closes communication between the well and the conduit system in response to the level of the hydraulic fluid within the well, is mounted within each pickup head assembly.

Means are provided to effect a pressure head differential between the reservoir and the sump sufficient to lift the fluid within the sump through the conduit system and into the reservoir. Thus, by placing the pickup head assemblies at one or more appropriate locations within the sump one can maintain the sump essentially dry.

A dry sump scavenging system embodying the concepts of the present invention, together with an alternative means by which to provide the requisite pressure head differential between the sump(s) and the reservoir, are shown by way of example in the accompanying drawings and described in detail without attempting to show all of the various forms and modifications in which the invention might be embodied; the invention being measured by the appended claims and not by the details of the specification.

DESCRIPTION OF AN EXEMPLARY EMBODIMENT

An exemplary scavenging system embodying the concepts of the present invention is identified generally by the numeral 10 on the attached drawings. Although a scavenging system 10 is readily adaptable for inclusion in any recirculating system for hydraulic fluid wherein it is desired that the collecting pan, or sump, remain essentially dry, and wherein an independent fluid supply reservoir is to be employed, it will be appreciated that the scavenging system 10 is particularly adapted for inclusion in a vehicular engine, a vehicular transmission, or the like. Accordingly, and in order to facilitate understanding of the invention, the disclosure of the scavenging system 10, together with an alternative embodiment of means by which to provide a pressure head differential between the sump and the reservoir, shall be described in the operational environment of a vehicular installation such as a transmission that is designated generally by the numeral 11 on the attached drawings.

Figure 1:
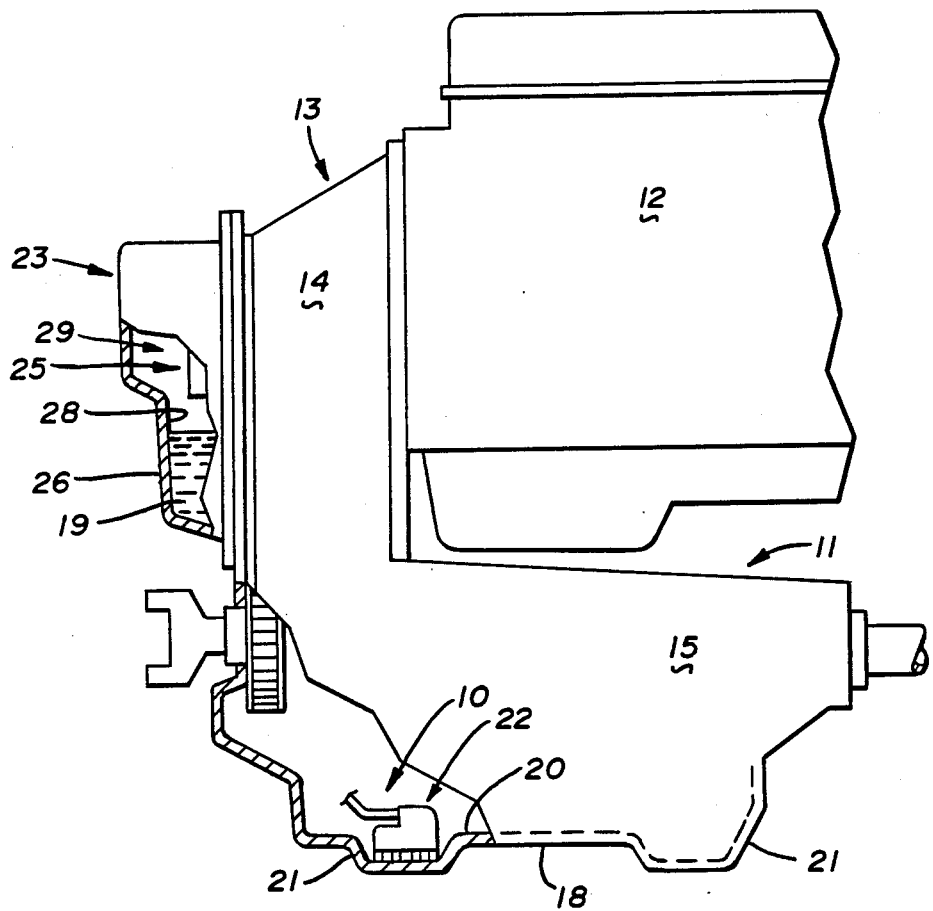
FIG. 1 is a side, elevational view, partly in section, of a representative operating environment, in this case a vehicular transmission, in which hydraulic fluid such as lubricating oil is required to be recirculated and to which environment a scavenging system embodying the concepts of the present invention may be readily adapted in order to maintain the fluid collecting sump of the transmission housing essentially dry.
Figure 2:
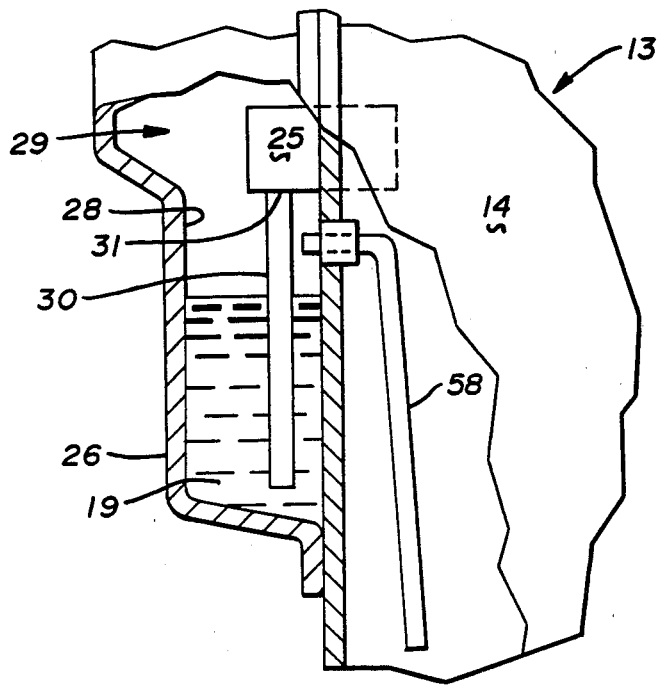
FIG. 2 is an enlarged area of FIG. 1 that has been even further broken away.

With particular reference, then, to FIG. 1, the transmission 11 is depicted in conjunction with a conventional engine 12. The transmission 11 has a housing 13 with an upper portion 14 that is secured to the engine 12 and encloses a torque converter, not shown. The lower portion 15 of the housing 13 encloses the transmission gearing, represented collectively and schematically in FIG. 3 by the numeral 16. A pan, or sump, 18 is provided at the lower portion 15 of the transmission housing 13 for collecting the hydraulic fluid 19, in this case the lubricating oil, as it leaves the transmission gearing 16.

It should be noted that in those installations wherein the sump 18 also serves as the fluid reservoir, the sump is, in most instances, demountably secured to the transmission housing 13. When employing a dry sump arrangement, however, one may form the sump 18 as an integral part of the housing 13, as shown. In either event, the floor 20 of the sump 18 is preferably provided with one or more depressions, or wells, 21 which define the lowermost level(s) of the sump 18 to which the fluid 19 in the sump 18 would tend naturally to flow and within which the fluid will therefore localize, or pool, to be scavenged. A pickup head assembly 22, hereinafter more fully described, is preferably received in each such well 21.

The transmission 11 also has an end cover 23 that is secured to the upper portion 14 of the transmission housing 13. The end cover 23 may enclose a typical, gear type, circulating pump 25. With the pump 25 so located, the lower portion 26 of the end cover 23 may incorporate a storage reservoir 28 for the hydraulic fluid 19. For the present arrangement to operate most effectively the reservoir 28 must be of sufficient volume that it can not only store the requisite amount of fluid 19 but also provide an pneumatic chamber 29 above the fluid 19. The pressure head differential, hereinafter more fully described in conjunction with the operation of the subject invention, is at least partially achieved by a reduction of the pressure within the pneumatic chamber 29.

It should be appreciated that a scavenging system embodying the concepts of the present invention allows both the pump 25 and the reservoir 28 to be located where most convenient. Normally selection of the location is determined by two factors: (1) the proximity and convenience for accessing a power take off to drive the pump 25; and (2) the distance through which the intake tube 30 must extend to feed the inlet port 31 of the circulating pump 25.

Figure 3:
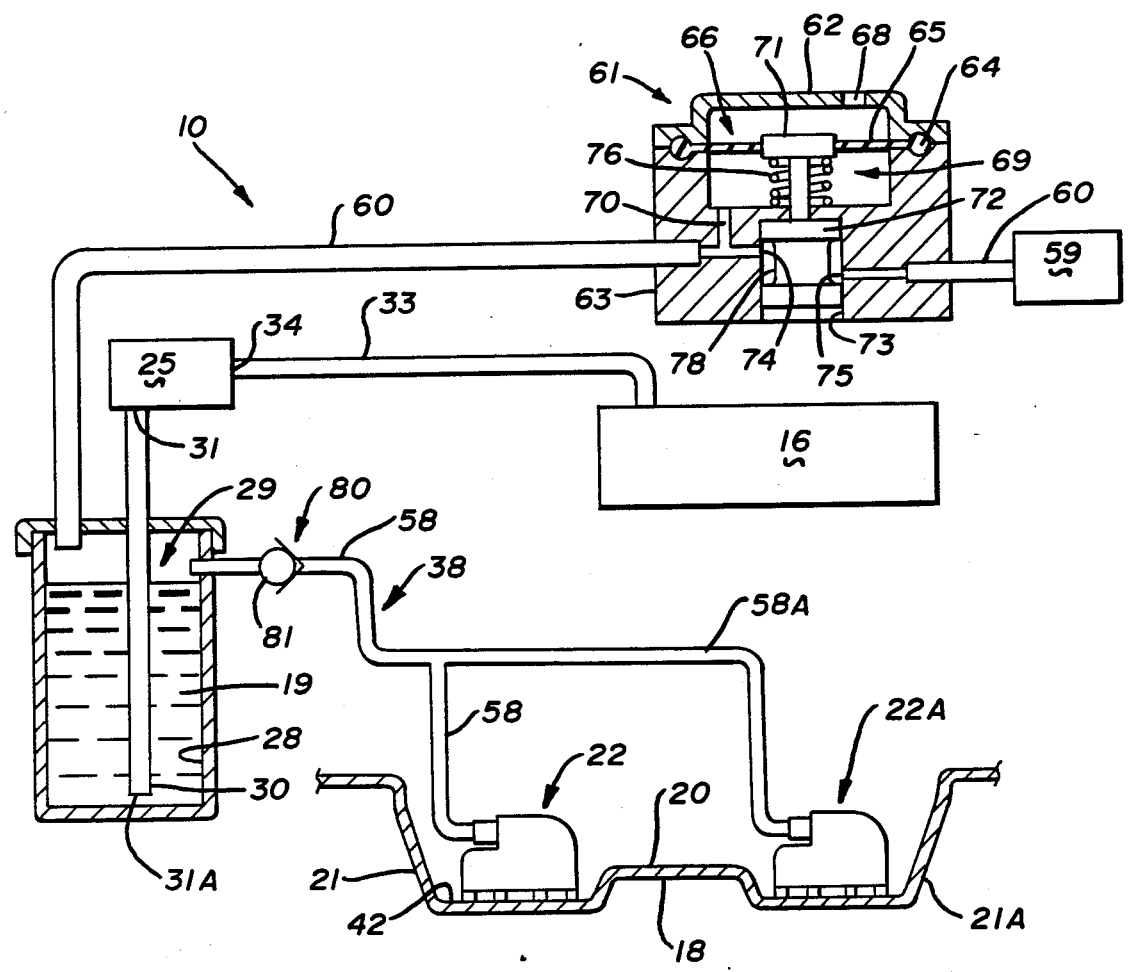
FIG. 3 is a schematic, elevational view of the operating environment depicted in FIGS. 1 and 2 in which a scavenging system embodying the concepts of the present invention, and employing one form of the means for providing a pressure head differential between the sump and the reservoir, is incorporated.

With primary reference now to FIG. 3, the inlet port 31 of the circulating pump 25 extracts fluid 19 from the reservoir 28 by virtue of the intake tube 30 that communicates between the lower extremity of reservoir 28 and the inlet port 31 of the pump 25 such that the distal end of the intake tube 30 serves as a displaced inlet port 31A for the pump 25. A gallery, or other distribution header, 33 communicates with the outlet, or discharge, port 34 of the pump 25 and delivers the fluid 19 to preselected locations within the transmission gearing 16, as is well known to the art.

Figure 4:
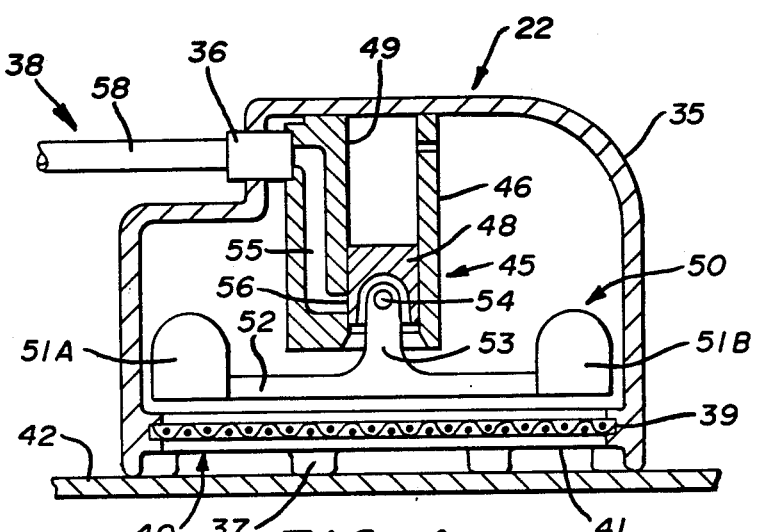
FIG. 4 is a schematic, cross-sectional view of a pickup head assembly that may be incorporated in a scavenging system embodying the concepts of the present invention.

As is best represented in FIG. 4, the pickup head assembly 22 has a generally dome shaped shroud 35. A coupler 36 is presented from approximately the apex of the shroud 35 to effect operative communication between the pickup head assembly 22 and the hereinafter described scavenging conduit system 38. As is well known to the art, a filter screen 39 may be removably mounted across the lower, open end 40 of the shroud 35. The rim 41 which circumscribes the lower, open end 40 of the shroud 35 may be circumferentially discontinuous and thereby serve to present foot means 37 by which the pickup head assembly 22 can rest on the floor 42 of the well 21—which floor 42 is, in effect, the subfloor of the sump 18—and yet permit the uninterrupted flow of fluid 19 from the well 21, through the screen 39 and into the interior of the pickup head assembly 22.

A pickup, or float, valve 45 within the assembly 22 employs a housing 46 that is secured to the interior of the shroud 35. A valve element 48 operates within a chamber 49 provided interiorly of the housing 46. A float means, indicated generally by the numeral 50, is operatively connected to actuate the valve element 48 in response to displacement of the float means 50. As such, the float means 50 is disposed to be displaced substantially vertically in response to the changing level of the fluid 19 within the well 21. The float means 50 may, for example, employ a pair of float chambers 51A and 51B that are carried in diametric opposition on a support beam 52. By way of an acceptable variation, though not shown, the float means 50 could well comprise an annular float chamber that would be carried on a support hub, or spider. In any event, the float means 50 must be operative to effect actuation of the valve element 48 in response to the generally vertical displacement of the float means 50. As depicted, the lower end of a connecting arm 53 may be joined to the support beam 52 with the arm 53 extending upwardly therefrom. The upper end of the support beam 52 is secured to the valve element 48, as by a pivot connection 54. The use of the pivot connection 54 precludes binding of the valve element 48 under operating conditions wherein the attitude of the well 21, and thus the attitude of the float means 50 supported on the fluid 19 within the wells 21, does not remain constant.

A passageway 55 communicates with the coupler 36 and extends through the valve housing 46 to open, via a pickup port 56, into the valve chamber 49. Movement of the valve element 48 within the chamber 49 opens and closes the pickup port 56 in response to the level of the fluid 19 in the well 21, as sensed by the float means 50. The float means 50 in each pickup head assembly 22 will respond virtually instantly to the level of the fluid 19 within the well 21 to open and close the pickup port 56 within a concomitant time frame, thereby effectively scavenging the fluid 19 out of the sump 18 and yet precluding the entrainment of air into the fluid 19.

As should now be surmised, actuation of the valve element 48 in response to the fluid level within the well 21, coupled with judicious selection and disposition of the float means 50 as well as appropriate placement of the pickup port 56 in close proximity to the floor 42 of the well 21, provides the physical arrangement by which to maintain the sump 18 essentially dry. In fact, only a minimal amount of fluid 19 is retained in the well 21 when the scavenging system 10 is properly installed.

As best represented in FIG. 3, the fluid 19 which returns to the sump 18, and pools in the well(s) 21, is then returned to the reservoir 28 by the scavenging conduit system 38. The system 38 includes a conduit 58 which attaches to the coupler 36 of the pickup head assembly 22 and communicates with the pneumatic chamber 29 located over the fluid 19 within the reservoir 28. A predetermined pressure head differential is provided between the pneumatic chamber 29 and the sump 18, and it is this pressure head which lifts the fluid 19 from the sump 18, through the scavenging conduit system 38 and into the pneumatic chamber 29, and thus the reservoir 28.

The requisite pressure head differential may, for example, be effected by appropriate application of the engine vacuum or a conventional vacuum pump. A exemplary vacuum source is, therefore, represented schematically at 59. The vacuum source 59 communicates with the pneumatic chamber 29 above the fluid 19 in the reservoir 28 by virtue of a second conduit 60. Care must be exercised so that the pressure within the chamber 29 is sufficient to effect the necessary lift to the fluid 19 within the sump 18, but not so low as to interfere with the withdrawal of fluid 19 from the reservoir 28 by the pump 25. This result can be assured by interposing a pressure regulator 61 within the conduit 60.

As best seen in FIG. 3, a cap 62 may be secured to the body portion 63 of the pressure regulator 61 and thereby seal the peripheral edge 64 of a diaphragm 65 therebetween so as to define opposed chambers across the diaphragm 65. The ambient chamber 66 located between the cap 62 and the diaphragm 65 is vented to atmosphere by a duct 68 which extends through the cap 62. The sensing chamber 69 located on the opposite side of the diaphragm 65 communicates with the conduit 60 by virtue of a passageway 70 provided in the body portion 63 of the regulator 61.

The central portion 71 of the diaphragm 65 is secured to a spool type valve element 72 that reciprocates axially within a valve chamber 73 provided within the body portion 63 of the regulator 61. Interiorly of the regulator that portion of the conduit 60 connected to the pneumatic chamber 29 communicates with the valve chamber 73 by a first, or demand, port 74, and that portion of the conduit 60 connected to the vacuum source 59 communicates with the valve chamber 73 by a second, or supply, port 75. The two ports 74 and 75 are displaced, one with respect to the other, along the axis of the chamber 73. The axial displacement of the ports 74 and 75 allows axial translation, and disposition, of the spool valve element 72 to effect a controlled throttling of the communication between the pneumatic chamber 29 and the vacuum source 59.

When the pressure within the pneumatic chamber 29 of the reservoir 28 falls below a preselected value, the pressure in sensing chamber 69 reflects that pressure drop in pressure and effects a closure of the demand port 74 by translation of the valve element 72 to preclude communication between the valve chamber 73 and the pneumatic chamber 29 in the reservoir 28. The axial dimension of the spool recess 78 is selected with reference to the axial displacement of the ports 74 and 75 so that the valve chamber 73 will remain in continuous communication with the vacuum source 59 while allowing the throttling action of the regulator 61 to be effected by progressively varying the access through port 74 from full open to full closed.

Conversely, as the pressure within the pneumatic chamber 29 rises above the preselected minimum value, the control spring 76 overcomes the decreasing resultant of the opposed forces applied to the diaphragm 65, the major component of which is the ambient air pressure within chamber 66, to translate the spool 72 in that direction which opens communication between the pneumatic chamber 29 and the vacuum source 59.

Thus, by selecting the strength of spring 76 in conjunction with the areas of the opposed work surfaces of the diaphragm 65 that are exposed to the ambient and the sensing chambers 66 and 69, respectively, axial translation of the spool type valve element 72 can be rather precisely predetermined, thereby maintaining the pressure within the pneumatic chamber 29 within a relatively narrow range.

Normally, the pneumatic pressure within the sump 18 is approximately equal to the ambient air pressure of the environment within which the system 10 is operating. In some installations, however, the pressure within the sump 18 may be slightly elevated relative to ambient. The pneumatic pressure within the sump 18 is generally the result of how the sump is vented. With the pneumatic pressure within the sump 18 being thus controlled by its particular venting arrangement it is relatively easy to control the pneumatic pressure within the chamber 29 so that the resulting pressure differential effects the head necessary to scavenge the fluid 19 from the sump 18, through the scavenging conduit system 38 and into the reservoir 28.

In order to accommodate the varying attitudes of the sump 18 a plurality of wells 21 may be employed. They may be located longitudinally, laterally and/or obliquely, one with respect to the other. As best represented in FIG. 3, a second well 21A is disposed in spaced relation with respect to well 21, and a second pickup head assembly 22A is disposed within well 21A. A branch extension conduit 58A communicates between the assembly 22A and the conduit 58 and forms a part of the scavenging conduit system 38. Irrespective of whether one or more pickup head assemblies 22 are required, each responds to the level of the hydraulic fluid 19 within the particular well 21 in which it is positioned in order to scavenge the fluid 19 from that well and thereby maintain the sump 18 essentially dry.

Should it be deemed desirable to preclude reverse flow of fluid 19 from within the conduits comprising the scavenging conduit system 38 back into the sump 18, the system 38 may be provided with a flow control means 80. One such flow control means is depicted in FIG. 3 and comprises a check valve 81 in the conduit 58.

Figure 5:
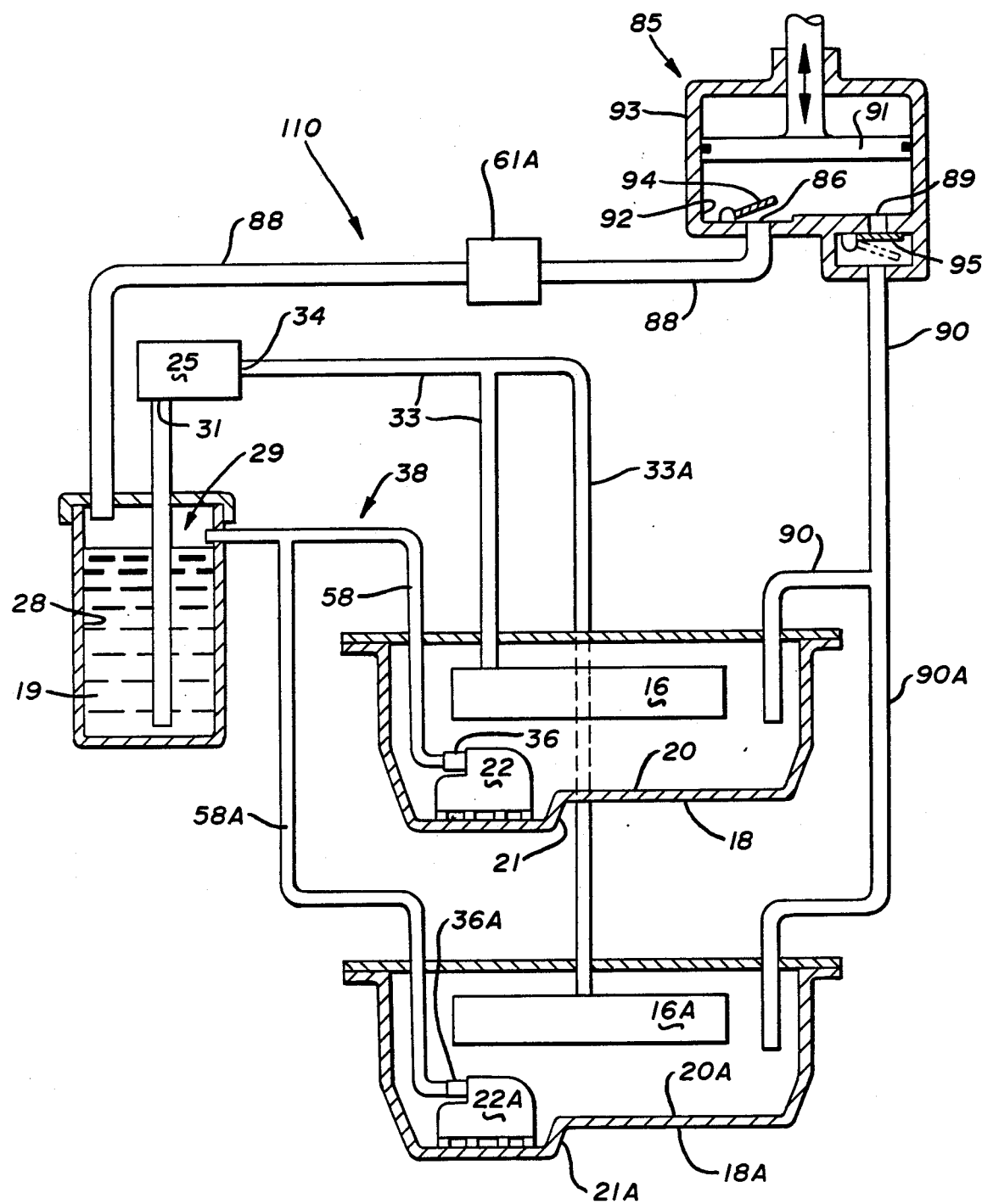
FIG. 5 is a schematic, elevational view similar to FIG. 3 and depicting a scavenging system according to the present invention employing an alternative form for the means by which to provide a pressure head differential between the sump and the reservoir.

An alternative scavenging system 110 whereby to effect the necessary pressure head differential between one or more sumps 18 and the reservoir 28 is depicted in FIG. 5.

The embodiment of the scavenging system 10 depicted in FIG. 3 is described in conjunction with a plurality of wells 21 in a single sump 18. The embodiment depicted in FIG. 5 could as easily be employed in conjunction with a plurality of wells 21 in a single sump 18. However, it should also be appreciated that a scavenging system embodying the concepts of the present invention could as well be employed in conjunction with an installation that incorporates a plurality of sumps 18. Accordingly, FIG. 5 depicts an exemplary scavenging system 110 wherein there are two individual sumps 18 and 18A. Sump 18 may, for example, be disposed to collect the fluid 19 from a portion of the transmission gearing 16, and sump 18A may be disposed to collect the fluid 19 from a displaced portion of the transmission gearing 16A, or other mechanism, to be lubricated by fluid 19. The pump 25 thus delivers the fluid to gearing 16 by a gallery, or other distribution header, 33 and to gearing 16A by an extension 33A to the gallery 33.

With specific reference, then, to FIG. 5, an air pump 85 may be employed to reduce the pneumatic pressure within the chamber 29 and at the same time serve to increase the pneumatic pressure within the sumps 18 and 18A. The resulting effect of the pump 85 will, therefore, be to create, and maintain, a pressure head differential between the individual sumps 18 and 18A and the chamber 29 within the reservoir 28.

The pump 85 may be provided with an intake port 86 that is connected to the pneumatic chamber 29 above the fluid 19 in reservoir 28 by a conduit 88. The exhaust port 89 of the pump 85 is connected, as by conduit 90, to the sump 18 and by branch 90A to sump 18A.

The use of a simple reciprocating piston 91 within the cylinder 92 provided interiorly of the pump housing 93 which alternatingly opens and closes a pair of unidirectional flow control valves, such as the flap valves 94 and 95 depicted, fully achieves the desired result. That is, as the piston 91 moves upwardly as viewed on FIG. 5 flap valve 95 closes exhaust port 89 but flap valve 94 opens intake port 86, thus tending to reduce the pressure within chamber 29. On the reverse stroke of piston 91 (as it moves downwardly as viewed in FIG. 5) the flap valve 94 closes intake port 86 but flap valve 95 opens exhaust port 89, thus tending to increase the pneumatic pressure within the sumps 18 and 18A through conduit 90 and branch 90A, respectively.

It may be deemed desirable to incorporate a regulator 61A in the conduit 88 in order to obviate a reduction of the pressure in the chamber 29 to the point where it would interfere with the operation of the pump 25. A pressure regulator 61 of the type heretofore described in conjunction with the exemplary embodiment depicted in FIG. 3 could well be employed as regulator 61A without the need for further description.

In any event, the action of the pump 85 tends to effect a pressure head differential between the pneumatic chamber 29 and the sumps 18 and 18A so that the fluid 19 in each sump 18 and 18A will be scavenged back to the reservoir 28. Specifically, the fluid 19 which returns to the sumps 18 and 18A pools in the wells 21 and 21A located in the floor 20 and 20A of the respective sumps 18 and 18A and is then returned to the reservoir 28 by the scavenging conduit system 38. The system 38 includes not only a conduit 58 which attaches to coupler 36 of the pickup head assembly 22 located in the well 21 of sump 18 but also a conduit 58A which attaches to coupler 36A of the pickup head assembly 22A located in the well 21A of sump 18A.

Based upon the description of the scavenging system 110 depicted in FIG. 5, it should now be readily understood that the embodiment depicted in FIG. 3 is as readily operative in conjunction with an installation that employs multiple sumps as it is in conjunction with the single sump installation described.

In addition, it should now also be appreciated that the systems 10 and 110, which both embody the concepts of the present invention, each fully achieve the objects of the invention.

The embodiments of the invention in which an exclusive property or privilege is claimed are defined as follows:

1. A scavenging system for hydraulic recirculating installations comprising: at least one sump having a first air chamber which collects circulating hydraulic fluid and which is to be maintained essentially dry; at least one pickup head assembly disposed within said sump; a reservoir for storing hydraulic fluid and being of sufficient size to maintain a second air chamber above the fluid in said reservoir; a pump for delivering the hydraulic fluid, which collects in said sump, from said reservoir; conduit means; said conduit means communicating between said pickup head assembly and the first air chamber located within said reservoir; a float valve mounted within each said pickup head assembly, said float valve opening and closing communication between said sump and said conduit means in response to the level of the hydraulic fluid within said sump; and, means to effect a reduction of the pressure within said first air chamber relative to ambient air pressure and an increase in the pressure within said second air chamber relative to ambient air pressure whereby to lift the fluid within said sump through said conduit means and into said reservoir when said float valve opens communication between said sump and said conduit means.

* * * * *